May 12, 1931. C. T. RAY 1,804,513
TILLAGE IMPLEMENT
Original Filed Sept. 6, 1921
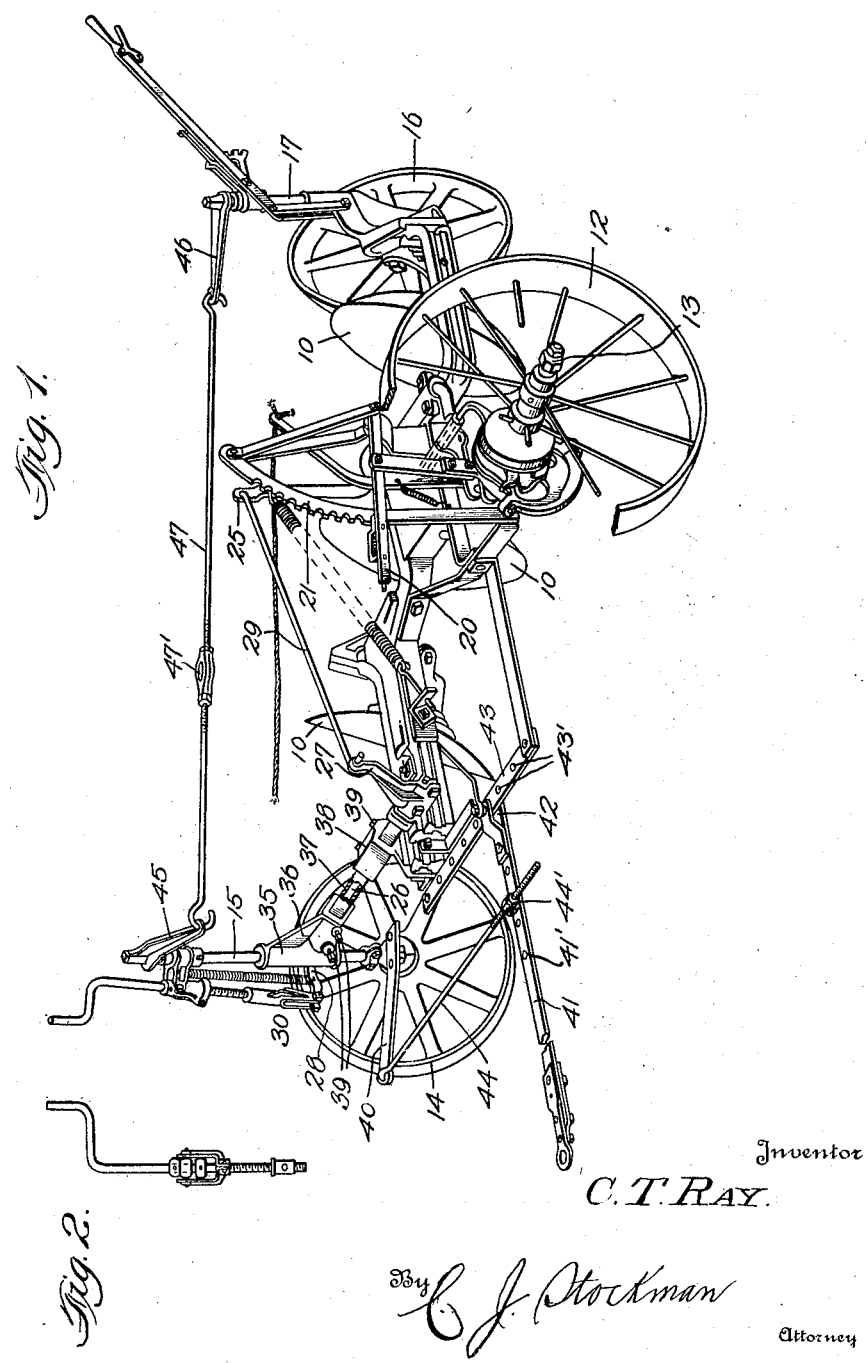
Inventor
C. T. RAY.
By C. J. Stockman
Attorney Patented May 12, 1931

1,804,513

UNITED STATES PATENT OFFICE

CHARLES T. RAY, OF LOUISVILLE, KENTUCKY

TILLAGE IMPLEMENT

Original application filed September 6, 1921, Serial No. 498,695. Patent No. 1,643,519, dated September 27, 1927. Divided and this application filed September 10, 1926. Serial No. 134,641.

This application is a division of an application for Letters Patent of the United States filed by me September 6, 1921, Serial Number 498,695, entitled Tillage implements, (which application has matured into patent issued September 27, 1927, and numbered 1,643,519,) and is filed in response to a requirement for division made by the Examiner in the aforesaid application Serial Number 498,695.

It has particular but not exclusive relation to a tractor drawn plow, of either the disk or mold-board type, and which includes, (1) a land wheel and furrow wheels and connections between the land wheel and either or both furrow wheels operative by power derived from the land wheel to raise or lower the frame and ground working elements from or into ground working position, and (2) means by which the wheels may be adjusted to variably regulate the depth of penetration of the ground working elements into the ground in their tilling operation and to level the frame. Plows of the types herein referred to are illustrated in my co-pending companion applications numbered 498,694 and 498,695, both filed September 6, 1921, for example. In the particular type of implement to which the present invention has especial reference, the furrow wheels are mounted upon substantially vertical shafts for guidance purposes, the said shafts being rotatable with relation to the frame in guiding the implement, as well as having up and down movement relatively to the frame in the movements of the soil working elements from and into soil tilling position and in their adjustments for depth of furrow.

The present invention has especial reference to a draft means through which the draft is applied to the frame of the implement and to means through which the draft means is also connected to both of the furrow wheel shafts, the said shafts, draft means and connections being so correlated that the implement is guided by force transmitted to both the front and the rear furrow wheels to turn both of said wheels simultaneously, but preferably in opposite directions, from an element of the draft means, whereby the implement is better guided and may make shorter turns.

One of the important purposes of the invention is to provide a simple and practicable draft-and-guiding means having the characteristics just suggested and which will not interfere in anywise with the movements of the vertical shafts, to which the furrow wheels are attached, relatively to the frame and ground working elements in the adjustments of said shafts for depth for penetration or to raise the ground working elements from or lower them into ground tilling position, notwithstanding that the force applied to turn the furrow wheels pivotally in the guiding of the implement is applied directly to the shaft of one of said furrow wheels and is transmitted from said shaft to the shaft of the other furrow wheel.

Another of the important purposes of the invention is to provide a simple and practicable means whereby the draft element may be adjusted laterally to various selected distances from the front furrow wheel to accommodate the different positions of the hitching points on different tractors.

These purposes, and others which will be apparent to one familiar with the structure embodied in this invention, are accomplished in the construction selected for illustration in the accompanying drawings which show it applied to a tractor-drawn disk plow. It should be understood, however, that the invention is equally applicable to a plow of the mold-board type and in fact its application to such a plow illustrated in my co-pending application Number 498,694, hereinbefore referred to.

In said drawings: Fig. 1 is a perspective view of a tractor-drawn disk plow having a draft means and adjusting means for the front furrow wheel shaft, forming the present invention: and Fig. 2 is a detail front view of a part of said adjusting means.

The frame of the implement may be of any suitable construction and the ground working elements, here illustrated as disks 10, are connected to the frame in any approved manner. The implement is supported by a land wheel 12 and its crank axle 13, a front furrow wheel 14 and its substantially vertical shaft 15, and rear furrow wheel 16 and substantially vertical shaft 17. The crank axle 13 is suitably journaled to permit the land wheel 12 to move forward or backward with relation to the frame and the substantially vertical shafts 15 and 17 are each suitably journaled to permit the furrow wheels 14 and 16 to be angled relatively to the frame for guidance purposes. These substantially vertical shafts also are mounted to be movable up and down with relation to the frame, as hereinbefore stated.

A power-lift mechanism of a suitable nature to be operative from the land wheel, is interposed between the land wheel, or the land wheel axle, and the frame of the implement and means including a lever 20 and a segment 21 are provided, as usual, in connection with such power-lift mechanisms, for adjustment purposes. It is considered to be unnecessary to illustrate or describe this power-lift mechanism in detail in the present application since a detailed construction thereof forms no essential part of the present invention. Moreover, such mechanisms are well known in the art. It may be stated, however, that the mechanism which I prefer is shown, described and claimed in my copending application for Letters Patent filed December 15, 1919 and numbered, serially, 344,962, to which reference may be had for an explanation of the preferred power-lift mechanism if such explanation be necessary or desired.

Connections are provided between the land wheel axle 13 and the shaft 15 of the forward furrow wheel, or between said axle and the shafts of both furrow wheels, whereby the said shaft, or the said shafts, are raised or lowered by power transmitted thereto from the said axle. Since these connections form no essential part of the present invention, it has been considered to be sufficient to illustrate one form, namely, a form in which only the forward furrow wheel shaft is raised or lowered from the land wheel axle. The illustrated connections are those embodied in my application for Letters Patent, Serial Number 498,695, of which the instant application is a division. These connections comprise a crank arm 25 which projects from the land wheel axle 13; a rock shaft 26 having crank arms 27 and 28 which project from its opposite ends and are arranged substantially at right angles with each other; a link 29 which connects the crank arm 25 of the land wheel axle 13 with the crank arm 27 on one end of the rock shaft and a means indicated generally by the reference character 30 for connecting the crank arm 28 with the substantially vertical shaft 15 of the forward furrow wheel. It will be understood that this shaft 15 of the forward furrow wheel is mounted for rotation and also for up and down movements in a bearing 35 formed as a part of a bracket 36 and that the lower end of the shaft is provided with an appropriate mounting for the forward furrow wheel. The bracket 36, in the present exemplification of the invention, is supported in its proper offset position with relation to the forward end of the frame by a rigid hollow arm 37 which is rigidly secured to the forward end of the frame as shown at 38 and extends into the bracket 36 and is secured to said bracket by means as indicated at 39. The rock shaft 26 extends through this hollow arm and through the bracket 36 and has its bearings therein. The means indicated generally at 30 which connects the crank arm 28 of the rock shaft 26 with the furrow wheel shaft 15 need not be particularly described herein since they have been illustrated, described and claimed in my aforesaid application No. 498,695. It may, however, be mentioned that it has a connection with the shaft 15 of a nature which permits relative rotation of said shaft and said means but does not permit relative up and down movement between the same, and that it includes elements by which it is adjustable to raise or lower the furrow wheel shaft 15 with relation to the frame without correspondingly rocking the rock shaft.

It will be understood from the foregoing that when the axle 13 of the land wheel is turned pivotally, in one direction or the other, either by power derived from the power-lift mechanism, or manually, the forward furrow wheel shaft 15 will be raised or lowered, according to the direction of pivotal movement of the land wheel axle and to a corresponding extent, and it will also be understood that the forward furrow wheel shaft 15 may be raised or lowered independently of the land wheel axle for adjustment purposes.

This furrow wheel shaft 15 also forms an element of the guiding means which will now be described. For this purpose its lower end is provided with a radial arm or crank 40. A draft bar 41 having its rear end pivoted at 42 to a fixed member 43 is connected with the crank arm 40 by a rod or link 44, whose connection to the draft bar includes a trunnioned nut 44'. Therefore, when the draft bar is turned, corresponding movement will be imparted to the shaft 15. Since this movement, which is for guidance purposes, is to be transmitted also to the shaft 17 of the rear furrow wheel 16 and since the angling movement imparted to the latter is preferably in a direction opposite the angling movement imparted to the forward furrow wheel 14, the upper ends of the shafts 15 and 17 are provided with cranks 45 and 46, respectively, one of which extends in a direction substantially at right angles with that of the other and these two cranks are connected with each other by a link 47 here shown as comprising two members connected with each other by a turn buckle 47' threaded on their confronting ends, whereby said link may be lengthened or shortened for an obvious purpose. The member 43 to which the rear end of the draft bar 41 is pivoted is provided with a series of openings 43' through any one of which the pivot 42 of the draft bar may extend; the end of the connecting rod 44 opposite the crank or radial arm 40 is threaded in the trunnioned nut 44'; and said trunnioned nut is adjustably connected to the draft bar 41, the latter having openings 41' for this purpose: whereby lateral adjustment of the draft bar to accommodate different hitching points on different tractors is provided for.

Having now described the invention what I believe to be new and desire to secure by Letters Patent, and what I therefore claim, is:—

1. A tillage implement having a frame and land and furrow wheels, the furrow wheels having mountings provided with upright shafts connected to permit simultaneous steering movement thereof, a draft bar having a transversely variable pivotal connection at its rear end with the frame, the front furrow wheel shaft having a radial arm, a connecting rod having one end pivoted to said arm and a connection between the other end of the connecting rod and the draft bar, said connection comprising an element having pivotal movement on a vertical axis relatively to and adjustable longitudinally of, said bar.

2. A tillage implement having a frame and land and furrow wheels, the furrow wheels having mountings provided with upright shafts to permit steering movement thereof, a draft bar having a transversely variable pivotal connection with the frame, the front furrow wheel shaft having a radial arm, and pivotal means connecting said bar and arm with each other, including an element mounted upon one of the same and having movement about a vertical axis relatively thereto and adjustable longitudinally thereof, and a connecting rod the corresponding end of which is adjustably attached to said element.

3. A tillage implement comprising a main frame, a land wheel and front and rear furrow wheels to support said frame, substantially upright furrow wheel shafts rotatably mounted at the front and rear ends of the frame, respectively, a steering connection between said shafts, a crank at the lower end of the front shaft, a draft bar, a transversely arranged draft bar supporting member rigidly connected to the frame, means to attach the rear end of the draft bar pivotally to said member at any one of a plurality of places along the length of said member, a trunnioned nut adjustably mounted on the draft bar, and a connecting member one of whose ends has a pivotal connection with the crank at the lower end of the forward furrow wheel shaft and the other of whose ends has a threaded engagement with said nut.

4. A tillage implement including a frame, a steering wheel shaft and supporting wheels one of which is mounted on the steering wheel shaft and said shaft having a projecting arm; said implement also including a draft bar having a transversely variable pivotal connection with a member of said frame and a connecting rod having pivotal connection at its opposite ends with said arm and draft bar respectively, the pivotal connection at one end of said rod including an element mounted to be movable about a vertical axis and to be adjustable longitudinally of the implement.

5. A tillage implement including a frame, a steering wheel shaft and supporting wheels one of which is mounted on the steering wheel shaft and said shaft having a projecting arm; said implement also including a draft bar having a transversely variable pivotal connection with a member of said frame, a trunnioned nut adjustable longitudinally of the draft bar, and a rod connecting the draft bar and said arm with each other, said rod having one of its ends pivoted to the arm and its other threadably connected to the trunnioned nut on the draft bar.

6. A tillage implement including a frame, a steering wheel shaft and supporting wheels one of which is mounted on the steering wheel shaft, an arm projecting from said shaft, a draft bar having transversely variable connection with a member of said frame and means connecting the draft bar and arm with each other including an element connected by a vertical pivot to one of the same and adjustable longitudinally thereof and a connecting rod having one of its ends adjustably attached to said element.

In testimony whereof I affix my signature.

CHAS. T. RAY.

CERTIFICATE OF CORRECTION.

Patent No. 1,804,513. Granted May 12, 1931, to

CHARLES T. RAY.

It is hereby certified that the above numbered patent was erroneously issued to the inventor said "Ray", whereas said patent should have been issued to B. F. Avery & Sons, of Louisville, Kentucky, a corporation of Kentucky, as shown by the records of assignments in this office; and that the said Letters Patent should be read with this correction therein that the same may conform to the record of the case in the Patent Office.

Signed and sealed this 7th day of July, A. D. 1931.

(Seal)

M. J. Moore,
Acting Commissioner of Patents.